United States Patent [19]

Park

[11] Patent Number: 4,608,929
[45] Date of Patent: Sep. 2, 1986

[54] AUTOMOBILE PARKING AND STORAGE SYSTEM

[76] Inventor: Kap Y. Park, 1522 Forest Glen Dr., Hacienda Heights, Calif. 91745

[21] Appl. No.: 725,343

[22] Filed: Apr. 19, 1985

[51] Int. Cl.$^4$ .............................................. B60S 13/02
[52] U.S. Cl. ......................................... 104/44; 104/38
[58] Field of Search ....................... 104/35, 36, 38, 44, 104/45, 46, 39, 48, 49, 50, 88, 127, 128, 129, 130; 340/933, 941

[56] References Cited

U.S. PATENT DOCUMENTS

| | | | |
|---|---|---|---|
| 1,496,307 | 6/1924 | Emison | 104/44 |
| 3,232,448 | 2/1966 | Browne et al. | 104/44 |
| 3,566,798 | 3/1971 | Peitzman | 104/44 |
| 3,610,159 | 10/1971 | Fickenscher | 104/88 |
| 4,172,422 | 10/1979 | McBride | 104/38 |
| 4,215,759 | 8/1980 | Diaz | 104/88 |

FOREIGN PATENT DOCUMENTS 2506965 12/1982 France .................. 104/37

*Primary Examiner*—Robert B. Reeves
*Assistant Examiner*—Dennis C. Rodgers
*Attorney, Agent, or Firm*—Kelly, Bauersfeld & Lowry

[57] ABSTRACT

An automobile parking and storage system permits a driver to turn an automobile any desired direction in a size restricted area. In a preferred form of the invention, the system includes a rotating assembly driven by a reversible motor along a subsurface track, an automobile-mounted transmitter which signals a receiver situated generally below the rotating assembly only when situated substantially directly over the receiver, and a controller which regulates movement of the rotating assembly through the motor in response to signals from the receiver. It is preferred that all transmitters and receivers be set to a standard frequency, to enable any automobile to be driven onto the rotating assembly and pivotted as desired in response to manipulation of a dash-mounted, remote-control switch box. Moreover, to prevent the inadvertent activation of the motor, the effective transmitting range of the transmitter should be limited to require the transmitter-bearing automobile to be situated directly over the receiver on the rotating assembly.

20 Claims, 5 Drawing Figures

U.S. Patent Sep. 2, 1986 4,608,929
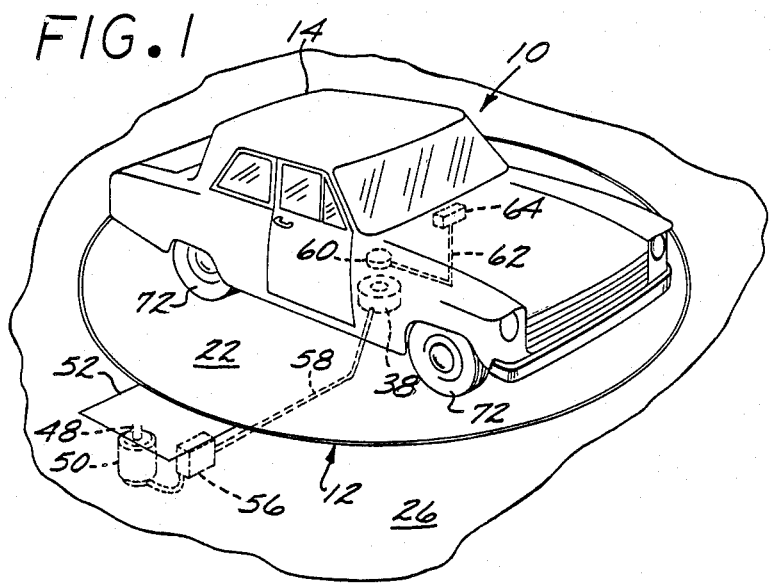
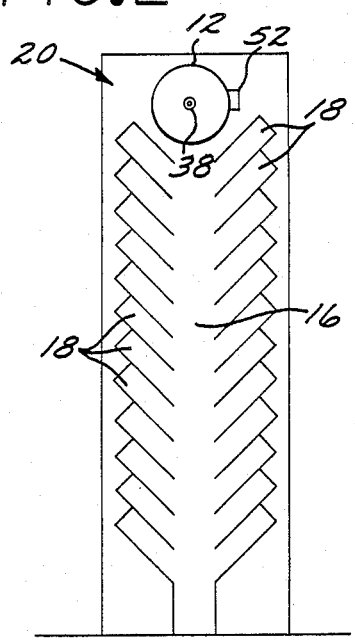
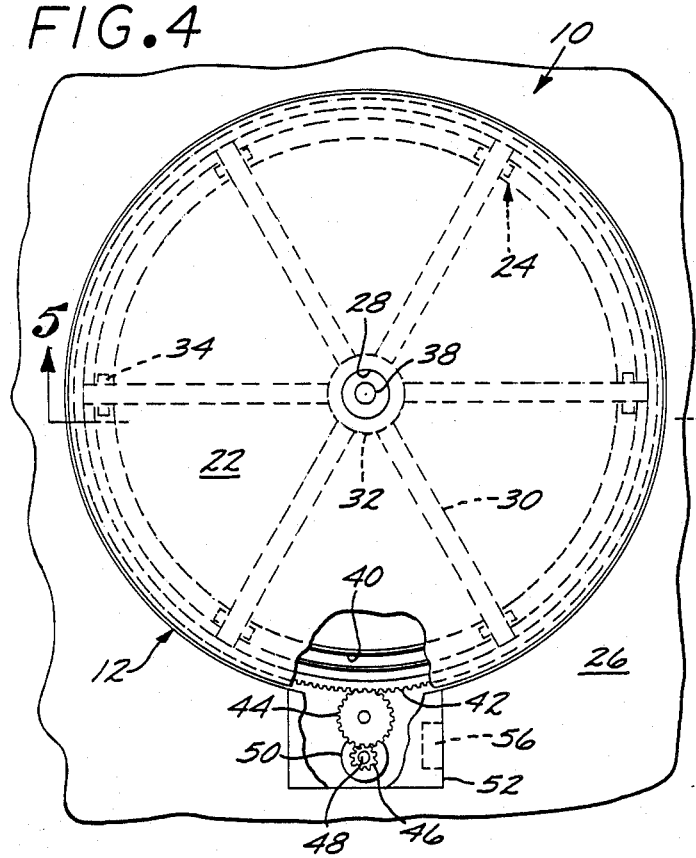
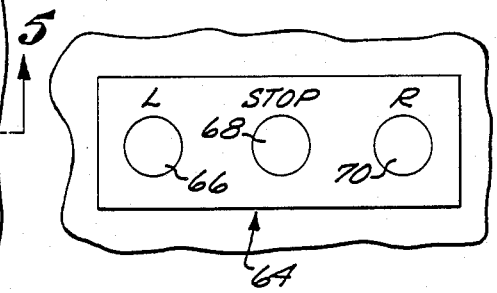
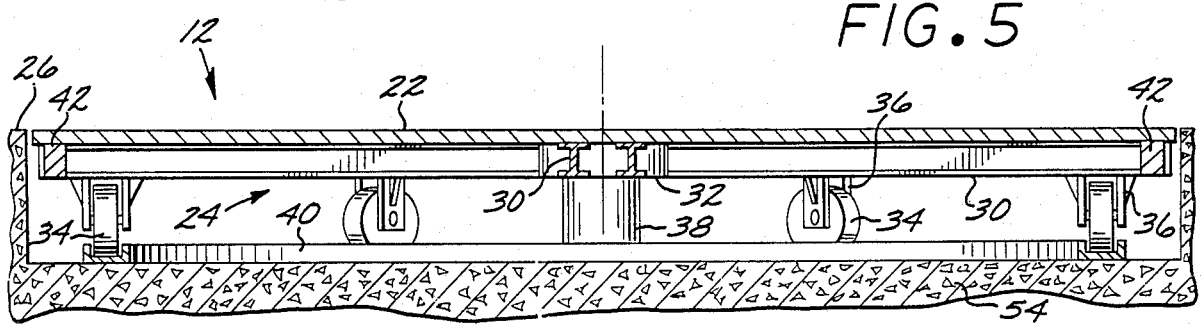

AUTOMOBILE PARKING AND STORAGE SYSTEM

BACKGROUND OF THE INVENTION

This invention relates generally to efficient space utilization systems, and, more specifically, to improved systems which permit space optimization for parking or storing automobiles.

The need for systems which optimize space utilization has become increasingly important. Efficiency, space availability and overall cost considerations each weigh heavily in the design and adoption of any new system. In this regard, our growing population, the accompanying increased use of automobiles, concerns for preserving as much of our natural environment as possible, and the rising cost of real estate have all contributed to the need for improving automobile parking and storage systems. One obvious method of improving parking and storage space utilization has been to squeeze as many automobile stalls into a given area at the expense of driving and maneuvering room. Such has been attempted in various apartment and high-rise building projects with limited success.

The chief drawback in limiting maneuvering room for automobiles has been the necessary reliance on either the skill of the average driver in negotiating restricted area turns and the like, or the provision of a convenient exit from the area. Indeed, where a long, narrow alley provides the only access to parking stalls on each side, but eventually dead-ends, drivers attempting to leave such areas have often been required to back-up their automobiles the entire length of the alley. This can be very irritating to the driver, and is sometimes even impossible. Moreover, in cases where residences are built in rugged terrain and where the driveways can, at times, be very steep, many drivers find the prospect of backing an automobile down the length of such driveways totally unacceptable.

Additionally, an increasing segment of the driving population, due to age or physical infirmities, finds it difficult to back-up an automobile at all. Such drivers would prefer an arduous and circuitous path on which they could negotiate their automobile in a forward direction, rather than back-up the automobile for even a short distance. Separately from the space utilization problems noted above, these drivers find it highly desirable to park their automobiles where they know they will be able to drive out in a forward direction.

Accordingly, there has been a need for an automobile parking and storage system which minimizes the required rearward driving within parking and storage areas, and which can be easily incorporated into conventional plans for parking lots, storage garages and the like. Additionally, there is a need for an automobile parking and storage system which can be economically added to existing parking lots and structures to improve and modify existing systems. Moreover, a device is needed which will enable average drivers to maneuver their automobiles around heretofore unnegotiable turns. Finally, there exists a significant need for an automobile parking and storage system which will help optimize the use of space which has been set aside for parking or storage, and which is economically attractive to builders and land owners, as well as being ecologically acceptable. The present invention fulfils these needs and provides other related advantages.

SUMMARY OF THE INVENTION

The present invention resides in an improved automobile parking and storage system which permits a driver to turn his automobile any desired direction in a size restricted area. The improved system comprises, generally, a rotating plate over which an automobile may be driven and parked, and means for turning that plate at the command of the driver to orient the automobile direction as desired. Such a system, when properly utilized, can significantly minimize the space needed for parking and storing automobiles, and provides the additional advantage of minimizing the required rearward driving within areas designated for parking or storage.

In a preferred form of the invention, the rotating plate forms the upper surface of a rotating assembly which is driven by a reversible motor along a subsurface track. This rotating assembly must be equipped with a sufficiently strong support structure to adequately withstand the forces imposed by a parked automobile. To this end, a plurality of roller-wheels, which form a portion of the support structure, permit the rotating plate to move as the roller-wheels follow the circular track.

Beneath the rotating plate and situated about the periphery of the support structure, a perimeter gear is provided. This perimeter gear is driven by the motor which is positioned below the ground level of the parking lot or garage and covered simply by an access plate. The motor can be connected to any standard power source, and is activated by a subsurface controller which functions only as directed by a driver within an automobile situated directly over and rotating assembly.

The controller is preferably connected to a radio-frequency receiver situated generally below the rotating assembly. This receiver is tuned to pick up a preferably internationally standard radio frequency transmitted from an automobile parked over the rotating plate. An automobile-mounted transmitter, which is activated by a remote-control switch box near the driver's seat, emits a very weak signal which requires the receiver to be no more than one meter away from the transmitter. The purpose of such a transmitting range limitation is to prevent activation of the motor unless the transmitter, and thus the automobile, is situated directly over the rotating plate. This feature of the invention enhances the safety of the present system, particularly when two or more rotating plates are situated near one another.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a preferred form of an automobile parking and storage system embodying the invention;

FIG. 2 is a plan view of a parking lot, illustrating a manner in which the system in FIG. 1 could be utilized;

FIG. 3 is a front elevational view of a remote-control switch box normally mounted near the driver's seat, which permits the driver to control movement of a rotating assembly;

FIG. 4 is a plan view of the preferred form of the invention, having a portion of an upper plate of the rotating assembly, and a portion of an access plate broken away to illustrate the manner in which a motor drives the rotating system, and further showing subsurface components in phantom; and FIG. 5 is an enlarged, fragmented vertical section taken generally along the line 5—5 of FIG. 4.

DETAILED DESCRIPTION OF THE PREFERRED EMBODIMENT

As shown in the drawings for purposes of illustration, the present invention is concerned with an automobile parking and storage system, generally designated by the reference number 10. The system 10 comprises an automobile rotating assembly 12 which is sufficiently strong to support an automobile 14, and means for moving the rotating assembly in a manner controllable from the automobile. Movement of the rotating assembly 12 permits a driver to orient the automobile 14 toward any desired direction in a convenient and efficient manner. Moreover, as will be more fully explained below, the moving means is preferably constructed with an inherent safety mechanism which prevents movement of the rotating assembly 12 unless the automobile 14 is situated directly over the rotating assembly.

The system 10 is particularly useful in situations where it is desirable to park or store as many automobiles as possible in a given area, and/or in situations where rearward driving is to be minimized. As shown in FIG. 2, where a long, narrow alley 16 provides the only access to parking stalls 18 on each side, but eventually dead-ends, drivers attempting to leave such a parking area 20 have often been required to back-up their automobiles the entire length of the alley. The system 10 can significantly improve the lot of drivers when incorporated into such automobile parking or storage areas 20, by allowing the drivers to turn their automobiles in what would otherwise be an area too small for such maneuvers. In the examples shown in the drawings, the system 10 is situated at the dead-end of the compact parking or storage area 20. A driver desiring to leave the area 20 could conveniently drive forward onto the rotating assembly 12, activate the moving means from the automobile 14 to turn it 180 degrees, and then drive out of the area in a forward direction.

In accordance with the present invention, and as illustrated best in FIGS. 1, 4 and 5, the rotating assembly 12 has a generally circular shape and includes an upper plate 22 and a support structure 24 which underlies the upper plate. Thus upper plate 22 can be constructed of any material suitable for supporting an automobile, and is typically situated so that its upper surface is substantially flush with the surrounding parking lot or storage area surface 26. An opening 28 is provided through the upper plate 22, and is located generally at the center or pivot point of the plate. The purpose of this opening 28 is to help facilitate control by the driver over movement of the rotating assembly 12 in a manner which will be more fully explained below. Although not shown in the drawings, this upper plate 22 may additionally include a thin upper layer of asphalt or concrete to blend in with the surrounding area.

The support structure 24 must have sufficient strength to support an automobile 14 driven over or parked on the upper plate 22. The support structure 24 includes a plurality of radially extending support beams 30 attached at their inner ends to a circular connector 32, and a roller wheel 34 positioned below each support beam near the perimeter of the rotating assembly 12 by respective roller supports 36. The circular connector 32 lies below the upper plate 22 in a position surrounding, but not projecting into, the opening 28, to partially define a space generally below the rotating assembly 12 in which a radio-frequency receiver 38 can be positioned. A subsurface, circular, U-shaped channel 40 is positioned below the support structure 24 to provide a track for the roller wheels 34. As the roller wheels 34 move through the track, the rotating assembly 12 moves accordingly, rotating about a point circumscribed by the circular connector 32.

The moving means comprises various cooperating components designed to cause movement of the roller wheels 34 through the track. In this regard, a perimeter gear 42 is securely affixed about the periphery of the support structure 24, and interfaces with an intermediate gear 44 driven by a pinion 46 which is mounted on the output shaft 48 of an electric motor 50. As shown in FIGS. 1 and 4, the motor 50 and the associated gears 42, 44 and 46 arranged to drive the rotating assembly 12, are preferably situated below the driving surface 26 and covered by an access plate 52. So situating these components of the system 10 places them in a location safe from moving automobiles, and yet provides ready access for maintenance and inspection purposes. The motor 50 can be powered by any convenient source, such as a power cable (not shown) routed through the ground 54 under the parking or storage area 20.

Also situated beneath the access plate 52 and adjacent the motor 50 is a controller 56 which activates and regulates the motor in accordance with signals received by the radio-frequency receiver 38. The receiver 38 is preferably situated near the center of the rotating assembly 12, so that the rotating assembly can be moved without so moving the receiver. This is necessary when directly connecting a cable 58 between the controller 56 and the receiver 38. However, the receiver 38 could be incorporated or directly attached to the support structure 24 if a suitable rotatable electrical contact (not shown) were supplied between the receiver and the cable 58.

To permit a driver to control movement of the rotating assembly 12, an automobile-mounted transmitter 60 is situated within the automobile 14 and positioned as close as possible to the receiver 38 when the automobile is parked over the upper plate 22. As a safety feature, the transmitter 60 emits a very weak radio-frequency signal that can be picked up by the receiver 38 only if the transmitter is no more than approximately one meter away from the receiver. This is important if a standard frequency is used by all automobile-mounted transmitters 60, to prevent the inadvertant activation of the moving means, and accompanying movement of the rotating assembly 12, by an automobile other than the one 14 parked over the upper plate 22. Further, the opening 28 in the upper plate 22 is provided simply to facilitate reception of signals by the receiver 38 which eminate from the transmitter 60 when the automobile 14 is parked over the rotating assembly 12.

As shown in FIGS. 1 and 3, the transmitter 60 is connected in a standard fashion by a cable 62 or the like, to a remote-control switch box 64. The switch box 64, which is preferably mounted near the driver's seat and is readily accessible to the driver, allows the driver to conveniently control the signals emitted by the transmitter 60, and thus control movement of the rotating assembly 12 when the automobile 14 is parked on the upper plate 22. The switch box 64 includes standard switching components and preferably provides at least three different options to the driver. In the embodiment shown, a left directional button 66, a stop button 68 and a right directional button 70 are provided to allow the driver to accordingly pivot the automobile 14 when parked on the rotating assembly 12. The switch box 64 and the transmitter 60 can conveniently be powered by the automobile battery (not shown), or alternatively by an independent, rechargeable battery source (also not shown).

To operate the system 10 described above, all that the driver must do is position the automobile 14 so that all four wheels 72 rest on the upper plate 22, and then activate the moving means to turn the rotating assembly 12. Pressing each of the buttons 66, 68 or 70 on the switch box 64 causes a separate signal to be transmitted to the receiver 38. For example, should the driver desire to turn the automobile 14 to the left, the left directional button 66 would be pushed. The receiver 38 would immediately sense the signal for a left turn from the transmitter 60, and relay that information to the controller 56. The controller 56 would in turn activate the electric motor 50 in a manner causing the appropriate movement of the rotating assembly 12. When the automobile 14 became oriented as desired, the driver would then press the stop button 68 which, through a similar sequence of events, would deactivate the electric motor 50.

From the foregoing, it is to be appreciated that the automobile parking and storage system 10, if properly utilized, can help optimize usage of space which has been set aside for parking or storage. The system 10 further can be economically added to existing parking lots and structures to improve or modify those structures, and can be easily incorporated into conventional plans for parking lots, storage garages and the like. Moreover, the system 10 will enable average drivers to maneuver their automobiles around previously unnegotiable turns, and minimize the required rearward driving within parking and storage areas.

Although a particular embodiment of the invention has been described in detail for purposes of illustration, various modifications may be made without departing from the spirit and scope of the invention. For example, rather than operating on a radio frequency, the receiver 38 could be a photoelectric sensor designed to receiver an encoded beam of light from the transmitter 60. Further, the motor 50, and associated gears 42, 44 and 46, could be alternatively placed within the periphery of the rotating assembly 12. Accordingly, the invention is not to be limited, except as by the appended claims.

I claim:

1. An automobile parking and storage system comprising:
    a generally circular upper plate;
    a support strucure underlying the upper plate and having sufficient strength to support an automobile when parked or driven over the upper plate, the support structure including a plurality of roller-wheels which permit rotational movement of the support structure;
    a subsurface track situated below the support structure through which the roller-wheels travel when the support structure is rotated;
    a perimeter gear situated about the periphery of the support structure;
    an electric motor having a portion thereof situated adjacent the perimeter gear;
    means for connecting the electric motor to the perimeter gear so that rotation of a motor output shaft will cause a rotation movement of the support structure and upper plate;
    a radio-frequency receiver situated immediately below and generally at the center of the upper plate;
    a controller which regulates activation of the motor and the direction of its rotation in response to signals received from the receiver;
    an automobile-mounted transmitter capable of sending a limited range radio-frequency signal to the receiver only when the automobile is positioned over the upper plate; and
    a remote-control switch box situated at a driver-accessible location within the automobile, the switch box determining the signal, if any, transmitted by the transmitter.

2. An automobile parking and storage system as set forth in claim 1, wherein the motor is situated in a subsurface location outside the perimeter of the support structure, the motor being covered by an access plate.

3. An automobile parking and storage system as set forth in claim 1, wherein the connecting means includes a pinion driven by the output shaft.

4. An automobile parking and storage system as set forth in claim 1, wherein the maximum effective range of the radio-frequency signal from the transmitter is one meter.

5. An automobile parking and storage system comprising:
    a rotating assembly capable of being rotated with an automobile thereon to orient the automobile in any desired direction;
    means for rotating the rotating assembly; and
    means for controlling the rotating means from the automobile, the controlling means including an automobile-mounted transmitter which is capable of sending signals to a receiver situated within or immediately below the rotating assembly, and a controller which regulates activation of the rotating means and the direction of its rotation in response to signals received from the receiver, such controlling means providing an inherent safety mechanism which prevents activation of the rotating means unless the automobile is situated directly over the rotating assembly.

6. An automobile parking and storage system as set forth in claim 5, wherein the rotating assembly includes an upper plate, a support structure underlying the upper plate, and a plurality of roller-wheels which permit movement of and support the rotating assembly.

7. An automobile parking and storage system as set forth in claim 5, wherein the rotating means includes an electric motor which, through a gear assembly, drives a perimeter gear situated about the periphery of the rotating assembly.

8. An automobile parking and storage system as set forth in claim 7, wherein all the components of the rotating means are situated below a driving surface, and are accessible through an overlying access plate.

9. An automobile parking and storage system as set forth in claim 5, wherein the inherent safety mechanism lies in a limitation imposed on the transmitter which requires it to be situated no more than one meter from the receiver to effectively send signals thereto.

10. An automobile parking and storage system as set forth in claim 5, wherein the transmitter is connected to a switch box situated near the driver's seat within the automobile, the switch box determining the signal to be relayed by the transmitter to the receiving means.

11. An automobile parking and storage system, comprising:

a rotating assembly capable of being rotated with an automobile thereon to orient the automobile in any desired direction;

means for rotating the rotating assembly;

an automobile-mounted transmitter capable of sending a plurality of signals intended for activating or deactivating the rotating means;

means for receiving the signals transmitted by the transmitter, the receiving means being permanently positioned with respect to the rotating assembly to provide the system an inherent safety mechanism wherein activation of the rotating means is prevented unless the automobile is situated directly over the rotating assembly; and a controller which regulates activation of the rotating means and the direction of its rotation in response to signals received from the receiving means.

12. An automobile parking and storage system as set forth in claim 11, wherein the rotating assembly includes an upper plate, a support structure underlying the upper plate, and a plurality of roller-wheels which permit movement of and support the rotating assembly.

13. An automobile parking and storage system as set forth in claim 12, further including a subsurface track for guiding the roller-wheels.

14. An automobile parking and storage system as set forth in claim 13, wherein the track forms a U-shaped circular channel situated below the rotating assembly.

15. An automobile parking and storage system as set forth in claim 11, wherein the rotating means includes an electric motor which, through a gear assembly, drives a perimeter gear situated about the periphery of the rotating assembly.

16. An automobile parking and storage system as set forth in claim 15, wherein all components of the rotating means are situated below a driving surface, and are accessible through an overlying access plate.

17. An automobile parking and storage system as set forth in claim 11, wherein the receiving means includes a receiver which is ground-mounted below the rotating assembly, and is exposed to the automobile by an opening through the upper surface of the rotating assembly.

18. An automobile parking and storage system as set forth in claim 11, wherein the transmitter and the receiving means operate on radio frequencies.

19. An automobile parking and storage system as set forth in claim 11, wherein the transmission range of the transmitter is limited to require the situating of the transmitter no more than approximately one meter from the receiving means to effectively send signals thereto.

20. An automobile parking and storage system as set forth in claim 11, wherein the transmitter is connected to a switch box situated near the driver's seat within the automobile, the switch box determining the signal to be relayed by the transmitter to the receiving means.

* * * * *

UNITED STATES PATENT AND TRADEMARK OFFICE
CERTIFICATE OF CORRECTION

PATENT NO. : 4,608,929

DATED : September 2, 1986

INVENTOR(S) : Kap Y. Park

It is certified that error appears in the above-identified patent and that said Letters Patent is hereby corrected as shown below:

In Column 1, line 67, please delete the word "fulfils" and insert therefor --fulfills--.

In Column 2, line 34, please delete the word "and" and insert therefor --the--.

In Column 3, line 51, please delete the word "Thus" and insert therefor --This--.

In Column 4, line 54, please delete the word "inadvertant" and insert therefor --inadvertent--.

In Column 5, line 48, please delete the word "receiver" and insert therefor --receive--.

In Column 5, line 58, please delete the word "strucure" and insert therefor --structure--.

In Column 6, line 5, please delete the word "rotation" and insert therefor --rotational--.

Signed and Sealed this

Eleventh Day of November, 1986

Attest:

DONALD J. QUIGG

*Attesting Officer*   *Commissioner of Patents and Trademarks*